(12) United States Patent
Okabe et al.

(10) Patent No.: US 9,151,942 B2
(45) Date of Patent: Oct. 6, 2015

(54) MICROSCOPE SYSTEM

(75) Inventors: Masashi Okabe, Tokyo (JP); Naohiro Ariga, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 835 days.

(21) Appl. No.: 13/177,629

(22) Filed: Jul. 7, 2011

(65) Prior Publication Data

US 2012/0026582 A1    Feb. 2, 2012

(30) Foreign Application Priority Data

Jul. 27, 2010  (JP) .................................. 2010-168309

(51) Int. Cl.
*G02B 21/26* (2006.01)
*G02B 21/00* (2006.01)
*G02B 21/36* (2006.01)

(52) U.S. Cl.
CPC .............. *G02B 21/36* (2013.01); *G02B 21/008* (2013.01); *G02B 21/365* (2013.01)

(58) Field of Classification Search
CPC .. G02B 21/00; G02B 21/004; G02B 21/0016; G02B 21/0024; G02B 21/0052; G02B 21/008; G02B 21/244; G02B 21/26; G02B 21/36; G02B 21/361; G02B 21/365; G02B 21/367
USPC .................................. 359/363, 368, 391–383
See application file for complete search history.

(56) References Cited

U.S. PATENT DOCUMENTS

| 5,276,550 | A | * | 1/1994 | Kojima ......................... 359/368 |
| 5,900,708 | A | * | 5/1999 | Den Engelse et al. ........ 318/640 |
| 6,046,844 | A | * | 4/2000 | Duis .............................. 359/392 |
| 6,091,842 | A | * | 7/2000 | Domanik et al. ............. 382/133 |
| 7,542,202 | B2 | * | 6/2009 | Hashimoto et al. ........... 359/381 |
| 2004/0119817 | A1 | * | 6/2004 | Maddison et al. .............. 348/79 |
| 2004/0170312 | A1 | * | 9/2004 | Soenksen ...................... 382/133 |
| 2010/0149364 | A1 | * | 6/2010 | Kang ......................... 348/222.1 |

FOREIGN PATENT DOCUMENTS

JP    Hei 8-86965    4/1996

* cited by examiner

*Primary Examiner* — Thong Nguyen
(74) *Attorney, Agent, or Firm* — Scully, Scott, Murphy & Presser, P.C.

(57) ABSTRACT

A microscope system including a stage on which a specimen is mounted and that can be moved in a direction that intersects with an optical axis of illumination light irradiated on the specimen; an observation optical system that acquires an image of the specimen on which the illumination light is irradiated; a viewing-range setting unit that sets a viewing range of the image acquired by the observation optical system and displayed on a display unit; a ratio calculating unit that calculates a ratio of the viewing range of the image, which is set by the viewing-range setting unit, relative to a maximum image-acquisition area that can be captured by the observation optical system; and a stage controller that controls a moving speed of the stage in accordance with the ratio calculated by the ratio calculating unit.

9 Claims, 11 Drawing Sheets

MICROSCOPE SYSTEM

BACKGROUND OF THE INVENTION

1. Field of the Invention

The present invention relates to a microscope system.

This application is based on Japanese Patent Application No. 2010-168309, the content of which is incorporated herein by reference.

2. Description of Related Art

In the related art, there is a known controller that controls the drive speed of an electrically powered microscope stage in accordance with switching of the magnification of objective lenses (for example, see Japanese Unexamined Patent Application, Publication No. Hei 8-86965). With the controller for an electrically powered microscope stage disclosed in Japanese Unexamined Patent Application, Publication No. Hei 8-86965, the drive speed of the electrically powered stage is reduced when the objective lens is switched to one having a higher magnification, and the drive speed of the electrically powered stage is increased when the objective lens is switched to one having a lower magnification; by doing so, even though the electrically powered stage is driven when the objective lens is switched, the moving speed of an observation object on the electrically powered stage is kept constant, which prevents disruption of specimen observation.

In recent years, however, the major method of observation has shifted from one in which an eyepiece is used to one in which a digital camera is used. In the microscope observation employing a digital camera, the display magnification of an image is changed via software by image processing such as digital zooming, etc., and the viewing range of an image displayed on a display, etc. is changed by switching a digital camera connected to the microscope to another digital camera with a different viewing range. In addition, image processing such as partial capturing during live preview, etc. is also performed.

With such a microscope employing digital cameras, if a stage is driven when image processing, such as digital zooming, partial capturing, etc., is performed or when the digital cameras are switched, the moving speed of an observation image relative to the viewing range of an image displayed on a display is suddenly changed, and there is a problem in that observation of the specimen is disrupted.

BRIEF SUMMARY OF THE INVENTION

The present invention has been conceived in light of the above-described circumstances, and an object thereof is to provide a microscope system that is capable of reducing changes in moving speed of an observation image relative to the viewing range of an image displayed on a display unit, even if a stage is driven when the viewing range of the image displayed on the display unit is changed.

In order to solve the above-described problems, the present invention employs the following solutions.

An aspect of the present invention is a microscope system provided with a stage on which a specimen is mounted and that can be moved in a direction that intersects with an optical axis of illumination light irradiated on the specimen; an observation optical system that acquires an image of the specimen on which the illumination light is radiated; a viewing-range setting unit that sets a viewing range of the image acquired by the observation optical system and displayed on a display unit; a ratio calculating unit that calculates a ratio of the viewing range of the image, which is set by the viewing-range setting unit, relative to a maximum image-acquisition area that can be captured by the observation optical system; and a stage controller that controls the moving speed of the stage in accordance with the ratio calculated by the ratio calculating unit.

With this aspect, once an image of the specimen on the stage irradiated with the illumination light is acquired by the observation optical system, the image is displayed on the display unit with the viewing range set by the viewing-range setting unit. In addition, an observation image of the specimen displayed on the display unit moves according to the moving speed of the stage controlled, which is by the stage controller.

In this case, if the viewing range of the image displayed on the display unit is reduced relative to the maximum image acquisition area that can be captured by the observation optical system, the distance that the observation image of the specimen moves when the stage is moved tends to increase. In addition, if the viewing range of the image displayed on the display unit is changed so as to become closer to the maximum image acquisition area that can be captured by the observation optical system, the distance that the observation image of the specimen moves when the stage is moved tends to decrease.

With this aspect, by controlling the moving speed of the stage with the stage controller in accordance with the ratio calculated by the ratio calculating unit, that is, the ratio of viewing range of the image displayed on the display unit relative to the maximum image acquisition area that can be captured by the observation optical system, when the viewing range of the image on the display unit is changed, the stage can be moved so as to reduce the difference between the moving speed of the observation image relative to the viewing range before the change and the moving speed of the observation image relative to the viewing range after the change.

For example, when a portion of the viewing range of the image on the display unit is partially captured as an area of interest, the moving speed of the stage is reduced by the stage controller in accordance with the ratio of the area of interest in the image relative to the maximum image acquisition area of the observation optical system, and, on the other hand, when returning to a normal mode from the partial capture mode, the moving speed of the stage is increased in accordance with this ratio. By doing so, a sudden change in the moving speed of the observation image relative to the viewing range of the image is prevented, thereby making it possible to realize stable observation.

In the above-described aspect, the ratio calculating unit may calculate at least one of a vertical scale factor and a horizontal scale factor of the viewing range of the image, which is set by the viewing-range setting unit, relative to the maximum image-acquisition area.

In the above-described aspect, the stage controller may increasingly reduce the moving speed of the stage with a reduction in the ratio calculated by the ratio calculating unit.

With this configuration, even if the stage is driven when the viewing range of the image on the display unit is reduced relative to the maximum image acquisition area of the observation optical system, the moving speed of the observation image relative to the viewing range of the image can be kept relatively stable.

In the above-described aspect, the stage controller may control the moving speed of the stage so as to make the moving speed of an observation image of the specimen relative to the viewing range of the image constant before and after the ratio calculated by the ratio calculating unit is changed.

With this configuration, the moving speed of the observation image of the specimen relative to the viewing range of the image can be kept constant before and after the change in the viewing range of the image displayed on the display unit, and stable observation can be realized.

In the above-described aspect, an overall-magnification calculating unit that calculates the overall magnification of the observation optical system may be provided, and the stage controller may control the moving speed of the stage in accordance with the ratio calculated by the ratio calculating unit and the overall magnification calculated by the overall-magnification calculating unit.

If the stage is driven when the size of the observation image of the specimen is increased relative to the viewing range of the image by changing the overall magnification of the observation optical system, the distance that the observation image moves relative to the viewing range of the image tends to increase. In this case, the difference in the change in moving speed of the observation image relative to the viewing range of the image displayed on the display unit can be reduced by reducing the moving speed of the stage with the stage controller. On the other hand, if the stage is driven when the size of the observation image of the specimen is reduced relative to the viewing range of the image, the distance that the observation image moves relative to the viewing range of the image tends to decrease. In this case, the difference in the change in moving speed of the observation image relative to the viewing range of the image on the display unit can be reduced by increasing the moving speed of the stage with the stage controller.

Therefore, by controlling the moving speed of the stage in accordance with the ratio calculated by the ratio calculating unit and the overall magnification calculated by the overall-magnification calculating unit, even if the stage is driven when the viewing range of the image displayed on the display unit and the size of the observation image of the specimen are changed, the moving speed of the observation image relative to the viewing range of the image can be kept stable.

In the above-described aspect, the observation optical system may be provided with an objective lens that collects observation light from the specimen irradiated with the illumination light; and the overall magnification may include the magnification of the objective lens.

With this configuration, when the objective lens is switched to another objective lens with a different magnification, the difference in the change in moving speed of the observation image relative to the viewing range of the image on the display unit can be reduced in a simple manner with the stage controller.

In the above-described aspect, the observation optical system may be provided with an image acquisition unit that captures observation light from the specimen irradiated with the illumination light; and the ratio calculating unit may calculate the ratio on the basis of the maximum image-acquisition area of the image acquisition unit.

With this configuration, when the image acquisition unit is switched to another image acquisition unit with a different maximum image acquisition area, the difference in the change in moving speed of the observation image relative to the viewing range of the image on the display unit can be reduced in a simple manner with the stage controller.

In the above-described aspect, the viewing-range setting unit may have a digital zoom function that electrically enlarges and shrinks an observation image of the specimen relative to the viewing range of the image; and the stage controller may control the moving speed of the stage in accordance with the ratio calculated by the ratio calculating unit and the magnification of the observation image of the specimen determined by the digital zoom function of the viewing-range setting unit.

With this configuration, with the digital zoom function of the viewing-range setting unit, the size of the observation image of the specimen can be changed in a simple manner without changing the focal distance of the observation optical system. In addition, when the magnification of the observation image of the specimen is changed with the digital zoom function, the difference in the change in moving speed of the observation image relative to the viewing range of the image on the display unit can be reduced in a simple manner with the stage controller.

In the above-described aspect, a stage drive unit that drives the stage; and a speed instruction unit that gives an instruction about moving speed of the stage to the stage drive unit may be provided.

With this configuration, the observation image of the specimen can be moved at a desired moving speed of the stage, instructed by the speed instruction unit. Therefore, even if the stage is driven when the viewing range, etc. of the image is changed, the moving speed of the observation image relative to the viewing range of the image can be maintained at the desired speed.

With the present invention, an advantage is afforded in that a change in moving speed of an observation image relative to the viewing range of an image displayed on a display unit is reduced, even if a stage is driven when the viewing range of the image displayed on the display unit is changed.

DETAILED DESCRIPTION OF THE INVENTION

First Embodiment

A microscope system according to a first embodiment of the present invention will be described below with reference to the drawings.

Figure 1:
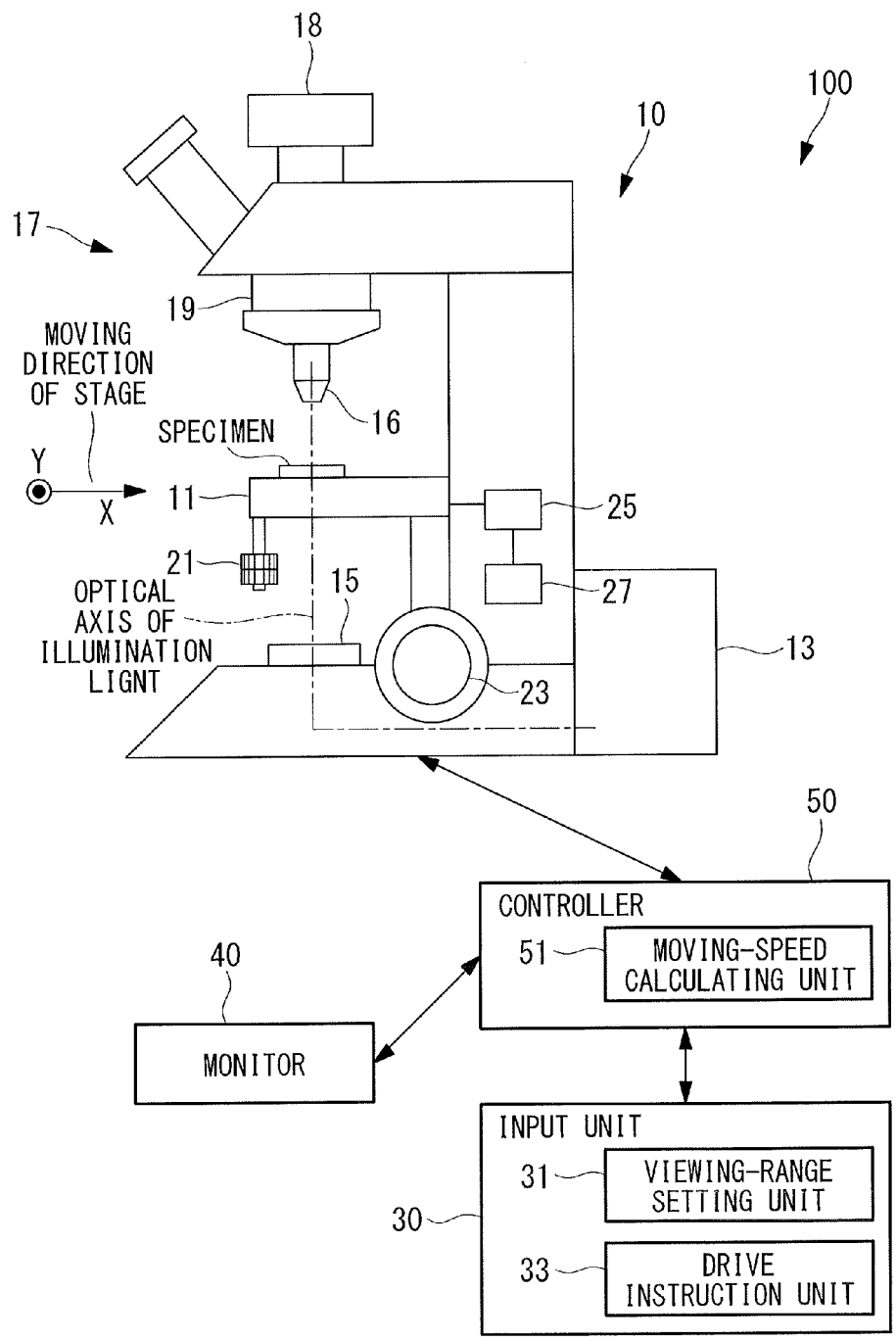
FIG. 1 is a configuration diagram showing, in outline, a microscope system according to a first embodiment of the present invention.

As show in FIG. 1, a microscope system 100 according to this embodiment is provided with, for example, an upright microscope apparatus 10, an input unit 30 through which instructions from a user are input to the microscope apparatus 10, a monitor (display unit) 40 that displays images, etc. acquired with the microscope apparatus 10, and a controller 50 that controls the microscope apparatus 10, the input unit 30, and the monitor 40.

The microscope apparatus 10 is provided with an electrically powered stage (stage) 11 on which a specimen (not shown) is mounted, a light source 13 that emits illumination light, a condenser 15 that focuses the illumination light emitted from the light source 13 and irradiates the specimen with the illumination light, and an observation optical system 17 that acquires an image of the specimen irradiated with the illumination light.

The microscope apparatus 10 is provided with an XY handle 21 that manually moves the electrically powered stage 11 in XY axial directions (directions that intersect with the optical axis of the illumination light radiated onto the specimen, in other words, the horizontal direction), a Z-axis focusing handle 23 that manually moves the electrically powered stage 11 in a Z-axis direction (a direction parallel to the optical axis of the illumination light radiated onto the specimen, in other words, the vertical directions), a pulse motor (stage driving unit) 25, and a motor controller (stage controller) 17 that controls the operation of the pulse motor 25. The X-axis direction and the Y-axis direction are perpendicular to each other.

The electrically powered stage 11 has at least XY position coordinates. This electrically powered stage 11 is configured so that the user can manually move it with the XY handle 21 or the Z-axis focusing handle 23 and so that it can be electrically moved by the motor controller 27 to XYZ coordinates specified by the user.

The observation optical system 17 is provided with objective lenses 16 that collect transmitted light from the specimen irradiated with the illumination light, and an image acquisition unit 18 that captures the transmitted light collected by the objective lenses 16.

The objective lenses 16 are attached to a revolver 19.

As the objective lenses 16, for example, phase-contrast objective lenses or bright-field objective lenses can be employed. When performing phase-contrast observation with the phase-contrast objective lenses, a phase plate is disposed in an optical path of the condenser 15. When performing differential-interference-contrast observation with the bright-field objective lenses, a prism and a polarizer are disposed on optical paths of the condenser 15 and the revolver 19, respectively.

As the image acquisition unit 18, for example, a CCD camera, a CMOS camera, a video camera, or a known photodetector, such as a photomultiplier tube, or the like, can be employed. The image acquisition unit 18 is disposed so that it can be switched to other image acquisition devices having different maximum image-acquisition areas that can be captured.

The input unit 30 is provided with, for example, a keyboard, a mouse, a joystick, or the like (not shown), and is configured so as to perform overall control of parameters input by the user. The parameters input to the input unit 30 are output to the monitor 40 and the microscope apparatus 10 via the controller 50. In addition, the input unit 30 is provided with a viewing-range setting unit 31 that sets the viewing range of an image displayed on the monitor 40 and a drive instruction unit 33 that outputs drive instructions for the electrically powered stage 11.

The viewing-range setting unit 31 is, for example, connected to a mouse, and is configured so that an area specified by the user by using the mouse on an image displayed on the monitor 40 can be set as the viewing range of the image.

The drive instruction unit 33 is, for example, connected to a joystick, and outputs a drive instruction for moving the electrically powered stage 11 in a direction to which the user tilts the joystick from the upright position.

The monitor 40 is configured to be able to display parameter settings of the parameters transmitted from the input unit 30, values thereof after alterations, and images acquired by the image acquisition unit 18.

The controller 50 is, for example, a personal computer that includes a CPU (Central Processing Unit). This controller 50 is configured so as to function as a ratio calculating unit that calculates a vertical scale factor and a horizontal scale factor of the viewing range of an image displayed on the monitor 40 relative to the maximum image-acquisition area that can be captured by the image acquisition unit 18 (hereafter, referred to as "ratio of image-viewing range area relative to the maximum image-acquisition area"). When the vertical scale factor and the horizontal scale factor of the viewing range of the image displayed on the monitor 40 relative to the maximum image acquisition area that can be captured by the image acquisition unit 18 are the same, it suffices to calculate one or the other of the vertical scale factor and the horizontal scale factor.

In addition, the controller 50 is provided with a moving-speed calculating unit 51 that calculates the moving speed of the electrically powered stage 11. The moving-speed calculating unit 51 is configured so as to calculate the moving speed of the electrically powered stage 11 in accordance with the image-viewing range ratio relative to the maximum image-acquisition area calculated by the controller 50. Specifically, the moving-speed calculating unit 51 calculates the moving speed of the electrically powered stage 11 in, for example, the X-axis direction, on the basis of the above-described vertical scale factor calculated by the controller 50, and calculates the movement-speed of the electrically powered stage 11 in, for example, the Y-axis direction, on the basis of the above-described horizontal scale factor calculated by the controller 50. When the above-described vertical scale factor and the above-described horizontal scale factor are the same, the moving-speed calculating unit 51 calculates the moving speed of the electrically powered stage 11 in the X-axis direction and the Y-axis direction as the same speed.

For example, a reference stage speed is assumed to be 1 mm/s. The moving speed of the electrically powered stage 11 is defined as Vn (n≠0) and the ratio of the image viewing range relative to the maximum image-acquisition area is defined as A. For example, when the longitudinal length of the image viewing range is ½ of the longitudinal length of the maximum image-acquisition area, the ratio A of the image viewing range relative to the maximum image-acquisition area is ½.

The moving speed Vn (mm/s) of the electrically powered stage 11 is expressed by the following expression (1)

$$Vn = 1 \times A \quad (1)$$

The motor controller 27 controls the operation of the pulse motor 25 on the basis of the moving speed of the electrically powered stage 11 calculated by the moving-speed calculating unit 51. That is, the motor controller 27 controls the moving speed of the electrically powered stage 11 via the pulse motor 25 in accordance with the ratio of the image viewing range relative to the maximum image-acquisition area.

Figure 2:
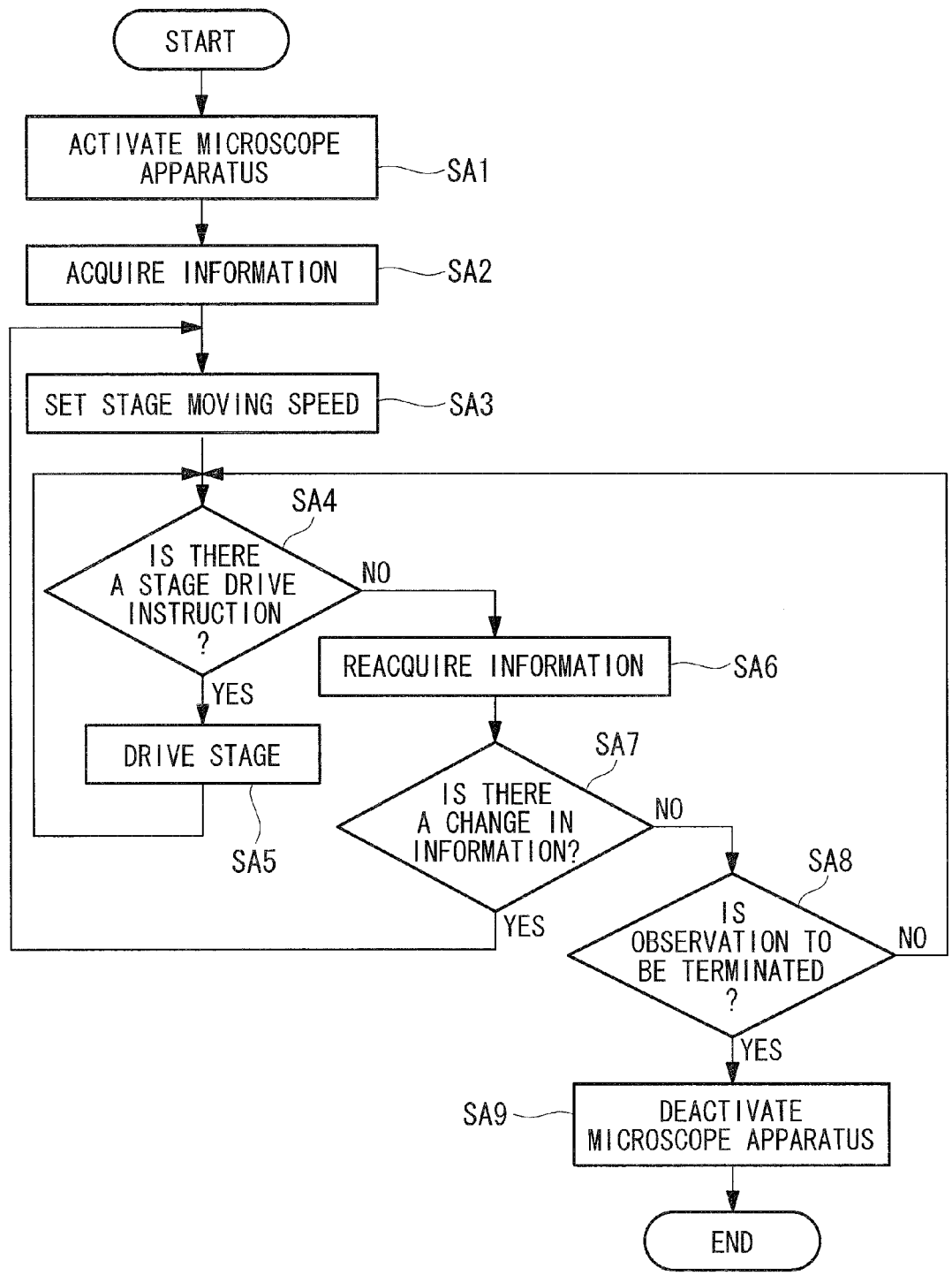
FIG. 2 is a flowchart showing the observation procedure for the microscope system in FIG. 1.

The operation of the thus-configured microscope system 100 according to this embodiment will be described with reference to the flowchart in FIG. 2.

To observe a specimen with the microscope system 100 according to this embodiment, first, the microscope apparatus 10 and the controller 50 are turned on to activate the microscope apparatus 10 and the controller 50 (Step SA1).

Upon mounting the specimen on the electrically powered stage 11 and emitting the illumination light from the light source 13, the illumination light is radiated on the specimen on the electrically powered stage 11 with the condenser 15. Transmitted light that passes through the specimen by irradiating it with the illumination light is collected by the objective lens 16, and the image-acquisition unit 18 captures the light via an image-forming lens (not shown).

At the image-acquisition unit 18, an observation image of the specimen is formed, and digital image processing is applied thereto. The observation image that has been digitally processed by the image-acquisition unit 18 is output to the controller 50 as a digital signal and is input to the monitor 40. Accordingly, an image of the specimen is displayed on the monitor 40.

During the start-up of the microscope system 100, for example, an image whose viewing range is the entirety of the maximum image-acquisition area of the image-acquisition unit 18 is displayed on the monitor 40. At the controller 50, the moving-speed calculating unit 51 acquires a preset initial value as the ratio of the image viewing range relative to the maximum image-acquisition area (Step SA2).

Next, according to the above-described expression (1), the moving-speed calculating unit 51 calculates a moving speed V1 of the electrically powered stage 11 in accordance with the initial value of the ratio. The calculated moving speed V1 is input to the motor controller 27, and such a pulse width T that makes the speed of the electrically powered stage 11 equal to the moving speed V1 is calculated. Accordingly, the speed of the electrically powered stage 11 is set to the moving speed V1 at the motor controller 27 (Step SA3).

Next, once the drive instruction unit 33 inputs drive instructions from the user for the electrically powered stage 11 ("YES" in Step SA4), the drive instructions are input to the motor controller 27 via the controller 50. At the motor controller 27, the operation of the pulse motor 25 is controlled on the basis of the calculated pulse width T.

Figure 3:
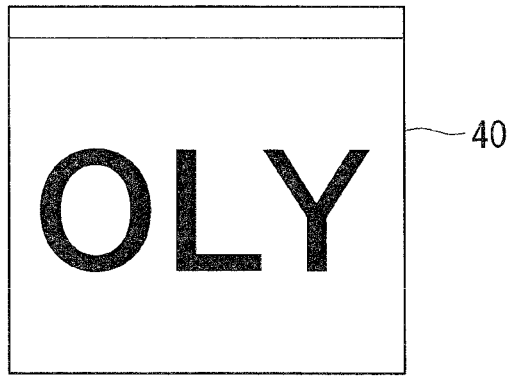
FIG. 3 is a diagram showing an image displayed on a monitor, wherein the viewing range thereof is the maximum image capturing area of an image acquisition unit.

By operating the pulse motor 25, the electrically powered stage 11 moves at the moving speed V1 in the direction specified by the user, that is, the direction in which the drive instruction unit 33 is tilted (Step SA5). Accordingly, in the image on the monitor 40 shown in FIG. 3, the observation image of the specimen ("OLY" in FIG. 3) moves at the moving speed V1.

Next, when there is no drive instruction from the user for the electrically powered stage 11 ("NO" in Step SA4), the moving-speed calculating unit 51 reacquires the ratio of the image viewing range relative to the maximum image-acquisition area (Step SA6). In Step SA6, processing shown in the flowchart in FIG. 4 is performed.

Figure 5:
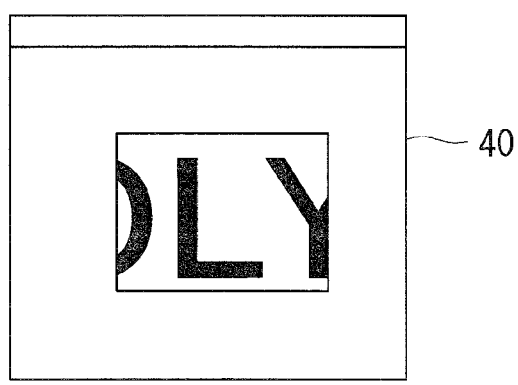
FIG. 5 is a diagram showing the viewing range of an image on a monitor in the case of partial capturing.

First, once the user specifies an area on the image displayed on the monitor 40 ("YES" in Step SB1), the specified area is set as the viewing range of the image. The viewing range of the image set by the viewing-range setting unit 31 is input to the monitor 40 via the controller 50. Accordingly, the viewing range of the image on the monitor 40 is changed (Step SB2). For example, when partially capturing a portion of viewing range of a normal image as an area of interest, as shown in FIG. 5, the viewing range of the image is limited only to the area of interest without changing the size of the observation image of the specimen.

Figure 4:
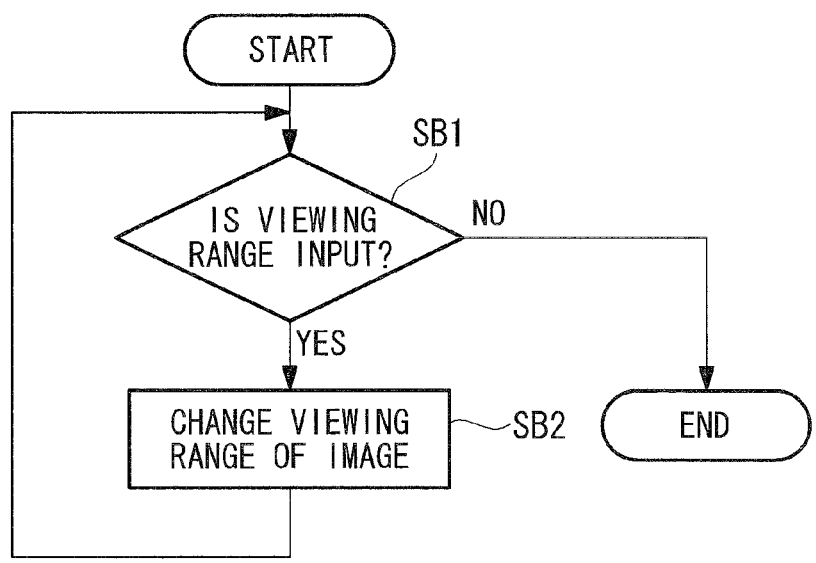
FIG. 4 is a flowchart showing a portion of the observation procedure for the microscope system in FIG. 1.

When the viewing range of the image on the monitor 40 is changed, the processing in the flowchart in FIG. 4 is completed via "NO" in Step SB1. Then, the controller 50 acquires the ratio of a new viewing range (the area of interest in the partial capturing) of the image on the monitor 40 relative to the maximum image-acquisition area of the image acquisition unit 18 (hereafter, referred to as "new ratio"). The new ratio acquired by the controller 50 is input to the moving-speed calculating unit 51.

At the moving-speed calculating unit 51, it is determined that the ratio of the image viewing range relative to the maximum image-acquisition area has been changed ("YES" in Step SA7), and the moving-speed calculating unit 51 calculates moving speed V2 of the electrically powered stage 11 in accordance with the new ratio. For example, assuming that the new ratio is changed to ⅓ of the immediately preceding ratio A, the moving speed V2 of the electrically powered stage 11 becomes ⅓ of the moving speed V1 according to expression (1). The new moving speed V2 calculated by the moving-speed calculating unit 51 is input to the motor controller 27, and the speed of the electrically powered stage 11 is set to the moving speed V2 (Step SA3).

In this case, once the drive instruction unit 33 inputs drive instructions from the user for the electrically powered stage 11 ("YES" in Step SA4), these drive instructions are input to the motor controller 27, and the operation of the pulse motor 25 is controlled so that the speed of the electrically powered stage 11 becomes the moving speed V2. Accordingly, the electrically powered stage 11 moves at the moving speed V2 (Step SA5), and the observation image of the specimen moves in the image on the monitor 40 shown in FIG. 5 at the moving speed V2, that is, at ⅓ of the moving speed V1.

Figure 6:
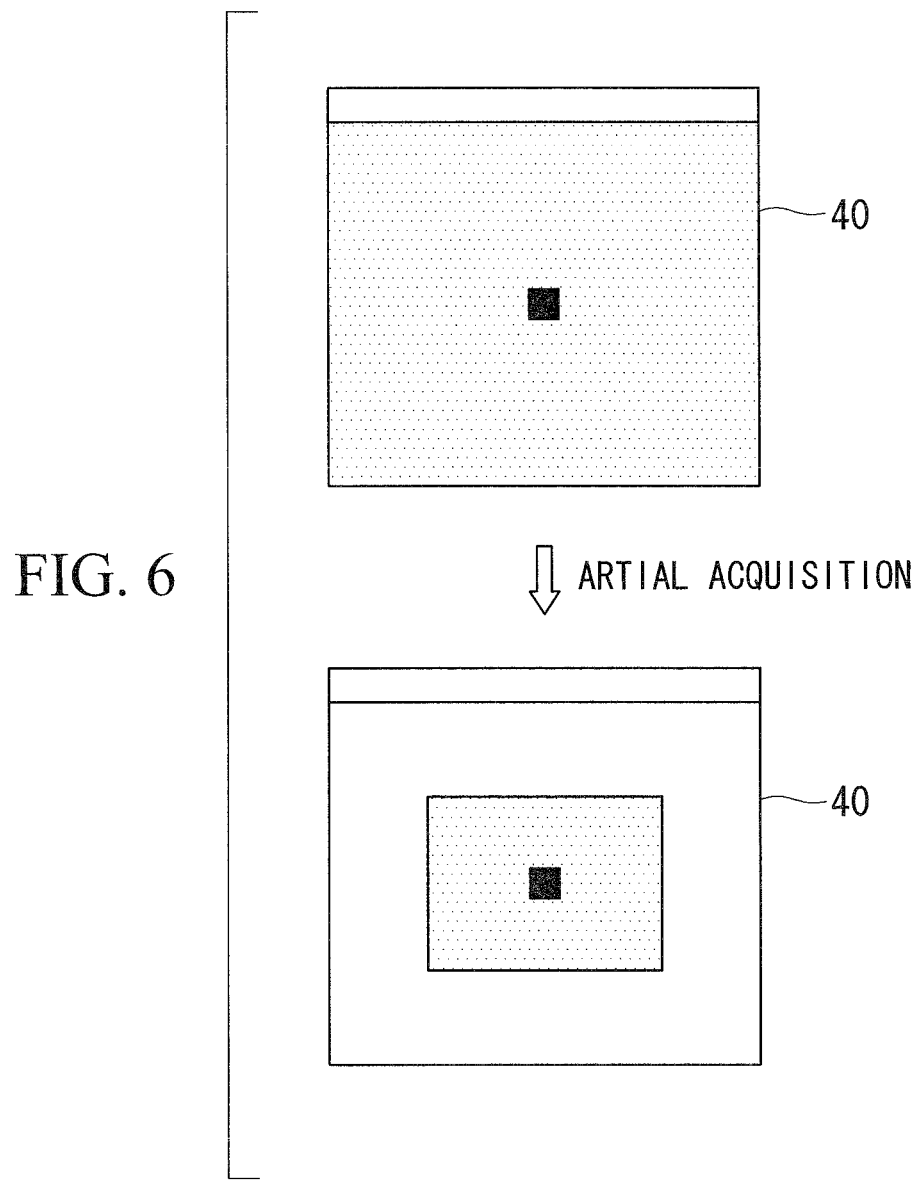
FIG. 6 is a diagram showing a manner in which an image on a monitor is switched from normal viewing range to viewing range in partial capturing.

As shown in FIG. 6, when switching from observation with normal viewing range to partial capturing observation, the distance that the observation image of a specimen (an object located at a center position of the image in FIG. 6; the same in FIG. 7) moves when the electrically powered stage 11 is moved tends to increase as compared with normal observation.

Figure 7:
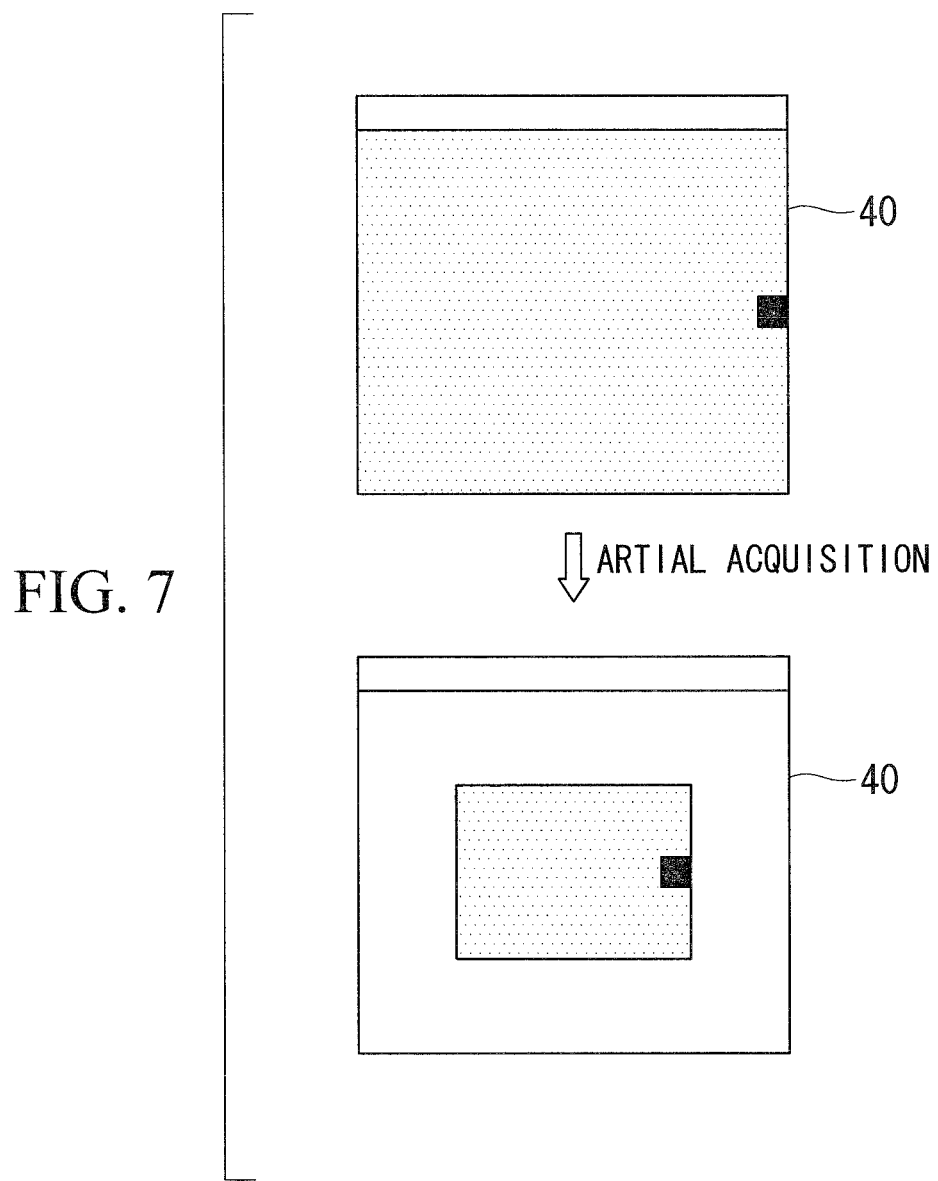
FIG. 7 is a diagram showing a state in which, in the image in FIG. 6, an observation image of a specimen is moved to an edge of the image.

With the microscope system 100 according to this embodiment, by reducing the speed of the electrically powered stage 11 to the moving speed V2 with the motor controller 27, the moving speed of an observation image relative to the viewing range of a normal image and the moving speed of an observation image relative to the viewing range of a partially captured image can be matched, as shown in FIG. 7. That is, the time taken for a specimen to move from the center of an image to an edge thereof in the viewing range for a normal image and the time taken for the specimen to move from the center of the image to the edge thereof in the viewing range for a partially captured image can be matched.

Next, once it is determined by the moving-speed calculating unit 51 that there is no change in the ratio of the image-viewing range relative to the maximum image-acquisition area in Step SA7 ("NO" in Step SA7), whether the observation is to be continued or terminated is determined by the user (Step SA8). If the observation is to be continued ("NO" in Step SA8), the process returns to Step SA4. On the other hand, if the observation is to be terminated ("YES" in Step SA8), the microscope apparatus 10 and the controller 5 are turned off (Step SA9), and the observation is terminated.

As has been described above, with the microscope system 100 according to this embodiment, by controlling the moving speed of the electrically powered stage 11 with the motor controller 27 in accordance with the ratio of the image viewing range relative to the maximum image-acquisition area, even if the electrically powered stage 11 is driven when the viewing range of the image on the monitor 40 is changed, the moving speeds of the observation image relative to the viewing range of the image before and after the change can be matched. Therefore, a sudden change in the moving speed of the observation image relative to the viewing range of the image is prevented, and observation can be performed stably.

In this embodiment, the moving speed of the electrically powered stage 11 is controlled by the motor controller 27 so that the moving speeds of the observation image relative to the viewing range of the image match before and after the ratio of image-viewing range relative to the maximum image-acquisition area is changed; however, the moving speed of the electrically powered stage 11 simply needs to be controlled in accordance with the ratio of the image viewing range relative to the maximum image-acquisition area, and, for example, the moving speed of the electrically powered stage 11 may be increasingly reduced as the ratio of the image, viewing range relative to the maximum image-acquisition area becomes smaller. By doing so, even if the electrically powered stage 11 is driven when the viewing range of an image on the monitor 40 is reduced relative to the maximum image-acquisition area of the observation optical system 17, the moving speed of an observation image relative to the viewing range of the image can be kept relatively stable.

In this embodiment, a pulse motor has been described as an example of the drive unit; alternatively, however, other actuators, such as, for example, a linear motor, a stepper motor, a piezoelectric motor, an ultrasonic motor, etc., may be employed. For example, when a DC motor is employed, the speed should be controlled by voltage.

In this embodiment, whether or not the ratio of the image viewing range relative to the maximum image-acquisition area has been changed is determined by the moving-speed calculating unit 51; however, for example, hardware that stores the ratio of the image viewing range relative to the maximum image-acquisition area and that determines whether or not the ratio has been changed may be provided.

In this embodiment, the drive instruction unit 33 is assumed to be connected to a joystick; however, so long as the user can input a drive instruction including an instruction for moving direction of the electrically powered stage 11, it may be connected to, for example, a mouse. In this case, the drive instructions should be input by, for example, having the user click on buttons displayed on a screen of the monitor 40 with the mouse.

Second Embodiment

Next, a microscope system according to a second embodiment of the present invention will be described.

Figure 8:
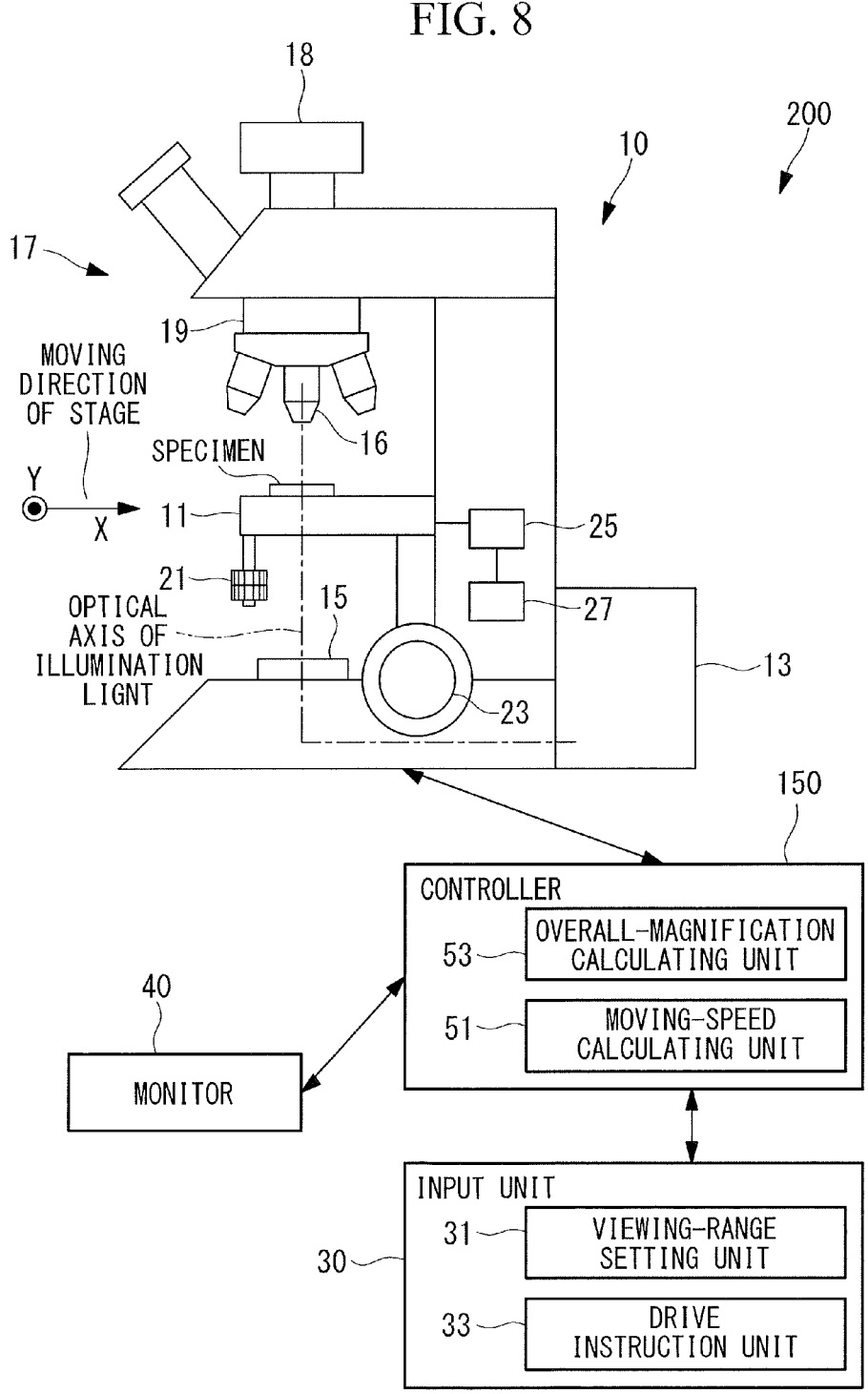
FIG. 8 is a configuration diagram showing, in outline, a microscope system according to a second embodiment of the present invention.

As shown in FIG. 8, in a microscope system 200 according to this embodiment, a controller 150 is provided with an overall-magnification calculating unit 53 that calculates the overall magnification of the observation optical system 17, and, furthermore, the microscope system 200 differs from the one in the first embodiment in that the motor controller 27 controls the moving speed of the electrically powered stage 11 in accordance with the overall magnification of the observation optical system 17.

In the following description of this embodiment, components in common with the microscope system 100 according to the first embodiment will be denoted with the same reference signs, and descriptions thereof will be omitted.

The overall-magnification calculating unit 53 is configured so as to calculate the magnification for all optical systems provided in the microscope apparatus 10. The optical systems include, for example, the objective lens 16, CCD camera size of the image acquisition unit 18, and so on. These optical systems individually store magnetic patterns that indicate their respective magnifications, and the individual magnetic patterns can be magnetically read by the overall-magnification calculating unit 53. The overall magnification of the optical systems calculated by the overall-magnification calculating unit 53 is input to the movement-speed calculating unit 51. A plurality of the objective lenses 16 are mounted on the revolver 19 in a switchable manner.

The moving-speed calculating unit 51 is configured to calculate moving speed Vn for the electrically powered stage 11 in accordance with the ratio of the image viewing range to the maximum image-capturing area and the overall magnification of the optical systems. For example, if the overall magnification of all optical systems, that is, a value obtained by multiplying the magnification of the objective lens 16 and the magnification of the CCD camera size, is defined as B, the moving speed Vn (mm/s) of the electrically powered stage 11 is expressed by the following expression (2).

$$Vn = 1 \times A \times (1/B) \qquad (2)$$

The operation of the thus-configured microscope system 200 will be described with reference to the flowchart in FIG. 2.

In Step SA2, the moving-speed calculating unit 51 acquires the initial value of the ratio of the image viewing range relative to the maximum image-acquisition area. In addition, the overall-magnification calculating unit 53 acquires overall magnification of the objective lens 16 and the CCD camera size of the image acquisition unit 18 and inputs it to the moving-speed calculating unit 51.

Next, according to the above-described expression (2), the moving-speed calculating unit 51 calculates moving speed V3 of the electrically powered stage 11 in accordance with the initial value of the ratio and the overall magnification. The calculated moving speed V3 is input to the motor controller 27, and the speed of the electrically powered stage 11 is set to the moving speed V3 (Step SA3).

Once the drive instruction unit 33 inputs drive instructions from the user for the electrically powered stage 11 ("YES" in Step SA4), the motor controller 27 moves the electrically powered stage 11 at the moving speed V3 (Step SA5). Accordingly, the observation image of the specimen moves on the monitor 40 at the moving speed V3.

Figure 9:
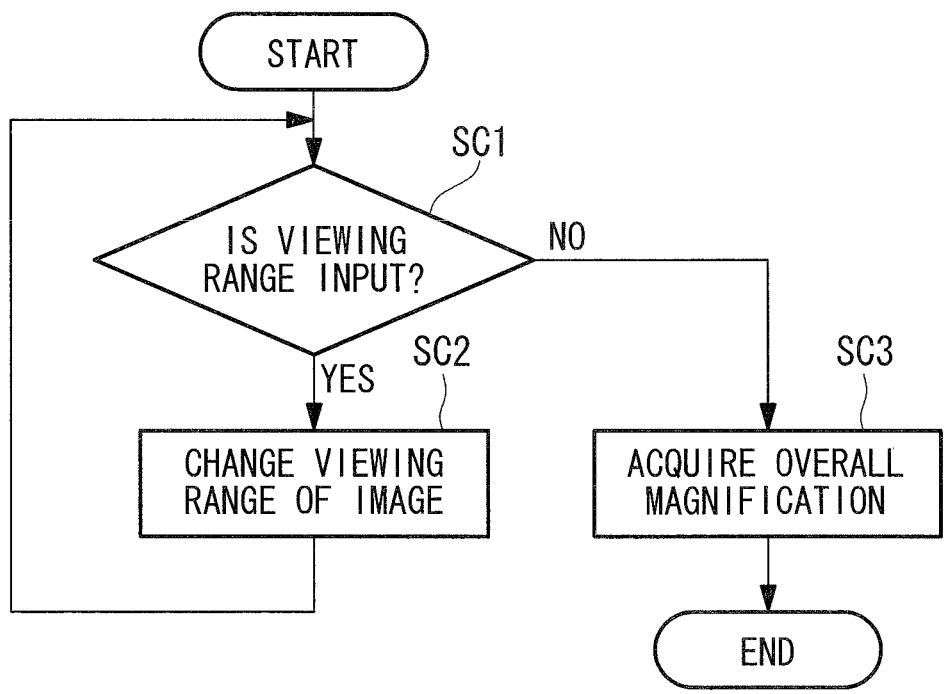
FIG. 9 is a flowchart showing the observation procedure for the microscope system in FIG. 8.

Next, when there is no drive instruction from the user for the electrically powered stage 11 ("NO" in Step SA4), the moving-speed calculating unit 51 reacquires the ratio of the image viewing range relative to the maximum image-acquisition area and overall magnification of the optical systems (Step SA6), and processing shown in the flowchart in FIG. 9 is performed.

Figure 10A:
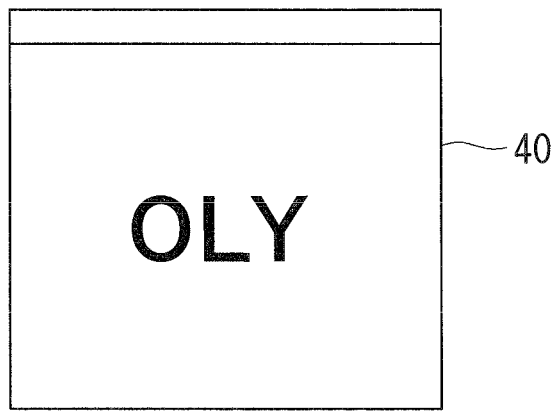
FIG. 10A is a diagram showing an image of a specimen, wherein the viewing range thereof is the entirety of a maximum image capturing area of an image acquisition unit.
Figure 10B:
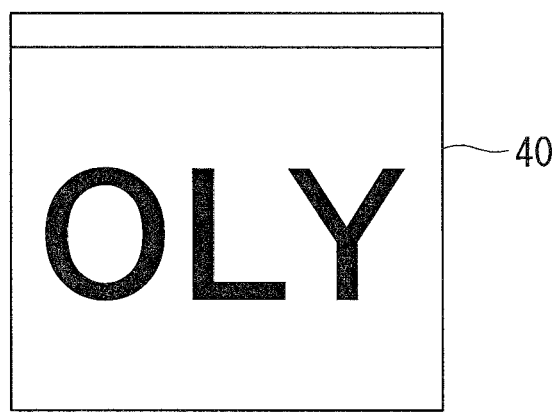
FIG. 10B is a diagram showing an image in which the observation image of the specimen in FIG. 10A is enlarged.
Figure 10C:
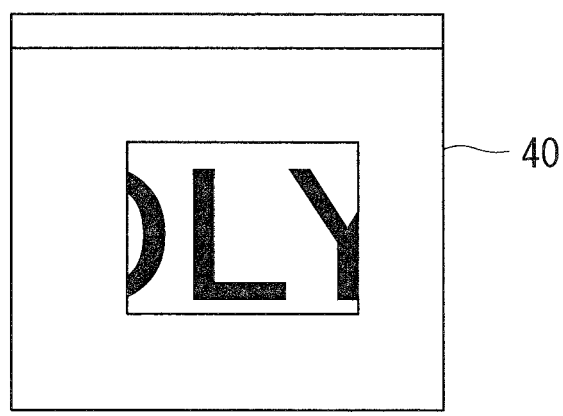
FIG. 10C is a diagram showing an image in which a portion of the viewing range of the image in FIG. 10B is partially captured.

For example, for an image of a specimen shown in FIG. 10A ("OLY" in FIG. 10A) for which the viewing range is the entirety of the maximum image acquisition area of the image acquisition unit 18, the case in which, by switching the objective lens 16 to a new objective lens 16 with a higher magnification, an observation image of the specimen is enlarged without changing the viewing range of the image as shown in FIG. 10B and a portion of the viewing range of the image is partially captured as an area of interest, as shown in FIG. 10O, will be described.

The viewing-range setting unit 31 sets an area specified by the user as the viewing range of an image ("YES" in Step SC1), and the viewing range of the image on the monitor 40 is changed (Step SC2). Next, via "NO" in Step SC1, the overall-magnification calculating unit 53 acquires the magnification of the CCD camera size of the image-acquisition device 18 provided in the microscope apparatus 10 and the magnification of the new objective lens 16 (Step SC3), and the acquired magnifications are input to the moving-speed calculating unit 51. Thus, the processing in the flowchart in FIG. 9 is completed.

Advancing to Step SA7, at the moving-speed calculating unit 51, it is determined that the ratio of the image viewing range relative to the maximum image-acquisition area and the overall magnification of the optical systems are both changed ("YES" in Step SA7), and the moving-speed calculating unit 51 calculates moving speed Vn in accordance with the new ratio and the overall magnification of the optical systems (Step SA3). For example, assuming that the new ratio is changed to ⅓ of the immediately preceding ratio A, and that the overall magnification of the optical systems is three times higher than the immediately preceding magnification B, the moving speed V4 of the electrically powered stage 11 becomes ⅑ of the moving speed V3 according to expression (2).

In this case, once the drive instruction unit 33 inputs drive instructions from the user for the electrically powered stage 11 ("YES" in Step SA4), these drive instructions are output to the motor controller 27, and the operation of the pulse motor 25 is controlled so that the speed of the electrically powered stage 11 becomes the moving speed V4. Accordingly, the electrically powered stage 11 moves at the moving speed V4 (Step SA5), and the observation image of the specimen moves on the monitor 40 at the moving speed V4, that is, at ⅑ of the moving speed V3.

Figure 11:
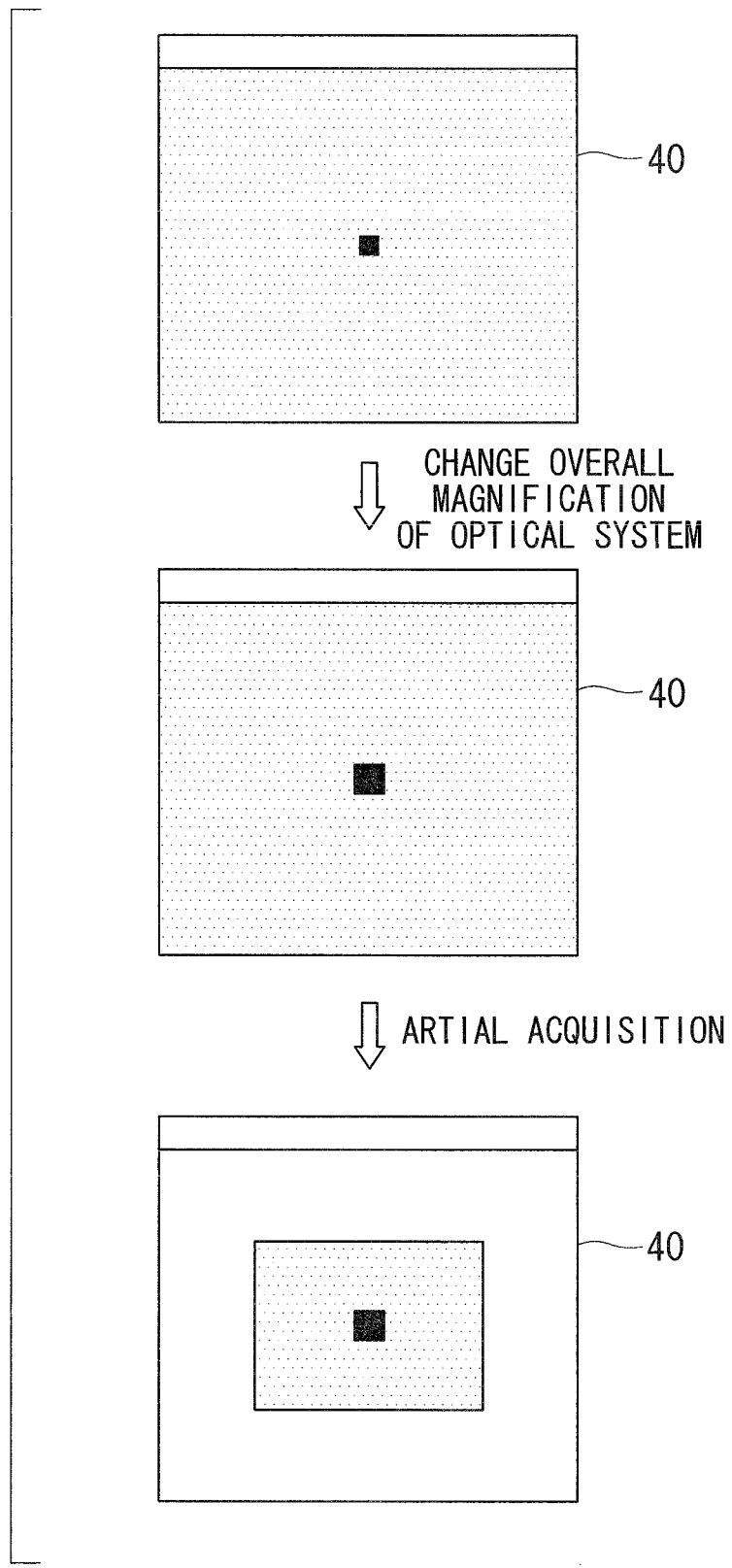
FIG. 11 is a diagram showing a manner in which an observation image of a specimen on a monitor is enlarged and normal viewing range is switched to viewing range for partial capturing.

As shown in FIG. 11, when the observation image of the specimen (an object disposed at a center position of the image in FIG. 11) is enlarged relative to the viewing range of the image, the distance that the observation image of the specimen moves when the electrically powered stage 11 is moved tends to be larger than before the enlargement. Furthermore, when the viewing range of the image is limited in the enlarged observation image of the specimen, as in the case of partial capturing, the distance that the observation image of the specimen moves when the electrically powered stage 11 is moved becomes even larger, as compared with the normal observation.

Figure 12:
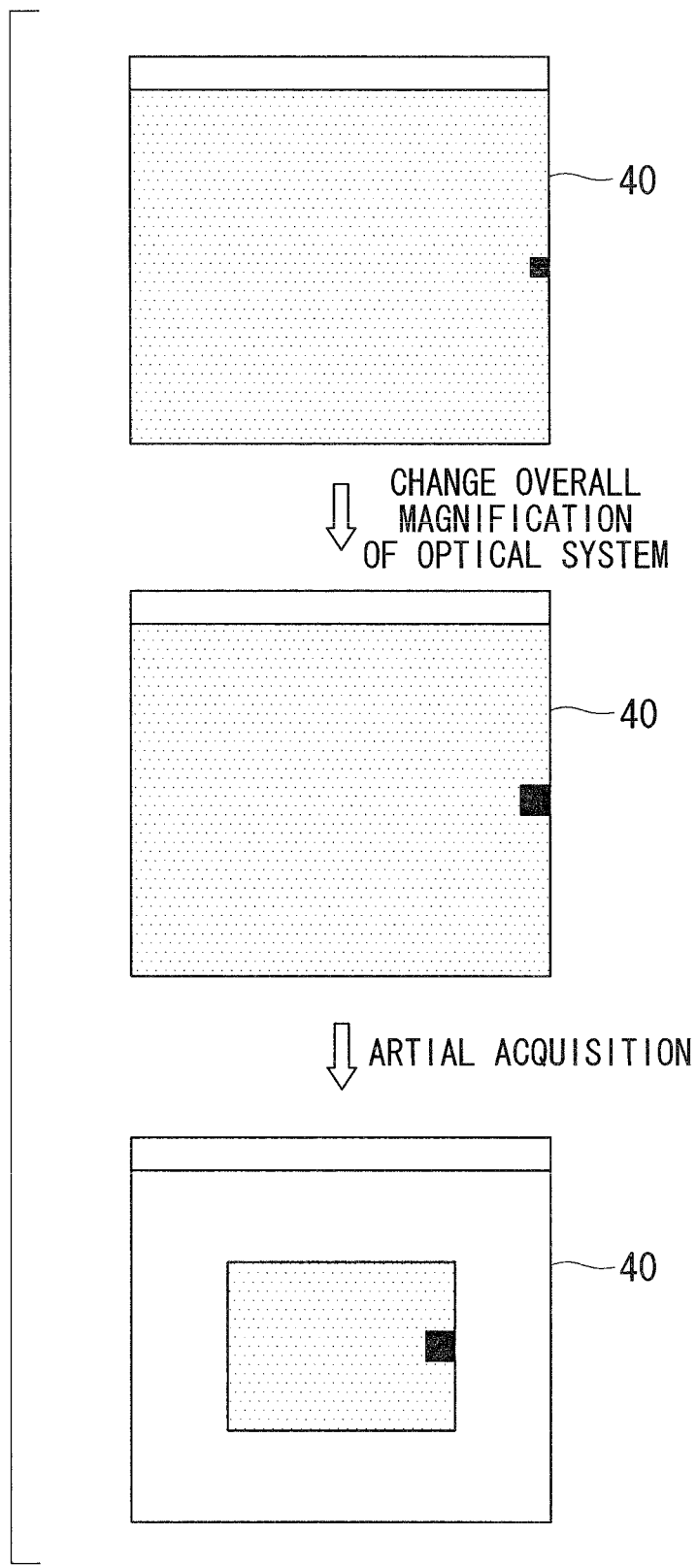
FIG. 12 is a diagram showing a state in which, in the image in FIG. 11, the observation image of the specimen is moved to an edge of the image.

With the microscope system 200 according to this embodiment, by reducing the speed of the electrically powered stage 11 to the moving speed V4 with the motor controller 27, the moving speed of an observation image relative to the viewing range of an image before the enlargement of the observation image and the moving speed of an observation image relative to the viewing range of an image after the enlargement of the observation image can be matched, as shown in FIG. 12. Furthermore, the moving speed of the observation image relative to the viewing range of an image before the partial capturing and the moving speed of the observation image relative to the viewing range of a partially captured image can be matched.

The processing in the case of "NO" in Step SA7 is the same as that in the first embodiment.

As has been described above, with the microscope system 200 according to this embodiment, by controlling the moving speed of the electrically powered stage 11 with the motor controller 27 in accordance with the ratio of the image viewing range relative to the maximum image-acquisition area and the overall magnification of the optical systems, even if the electrically powered stage 11 is driven when the viewing range of the image on the monitor 40 or the size of the observation image of the specimen is changed, the moving speed of the observation image relative to the viewing range of the image before and after each type of change can be matched. Therefore, a sudden change in the moving speed of the observation image relative to the viewing range of the image is prevented, and the observation can be performed stably.

In this embodiment, the CCD camera size of the image acquisition unit 18 is included in overall magnification of the optical systems; however, for example, only the magnification of the objective lens 16 may be employed as the overall magnification of the optical systems. By doing so, even when the objective lens 16 is switched to another objective lens 16 with a different magnification, with the motor controller 27, the moving speed of the observation image relative to the viewing range of the image on the monitor 40 before and after the switching of the objective lenses 16 can be matched in a simple manner. Also, only the CCD camera size of the image acquisition unit 18 may be employed as the overall magnification of the optical systems.

In addition, as the optical systems, a zoom lens, a television adaptor, etc. may be included in addition to the objective lens 16 and the CCD camera size of the image acquisition unit 18. In this case, a value obtained by multiplying the respective magnifications of components to be combined, that is, the objective lenses 16, the CCD camera size of the image acquisition unit 18, the zoom lens, the television adaptor, etc., should be employed as the overall magnification of the optical systems.

In this embodiment, the magnetic patterns stored in the individual optical systems are magnetically read by the overall-magnification calculating unit 53; alternatively, however, optical patterns that indicate respective magnifications may be stored in the individual optical systems, and the overall-magnification calculating unit 53 may read the optical pattern for each optical system with an optical sensor.

In this embodiment, the controller 50 is provided with the overall-magnification calculating unit 53; alternatively, however, for example, the input unit may be provided with the overall-magnification calculating unit 53, and the user may input all magnifications of the optical systems to the overall-magnification calculating unit 53 with a keyboard, or the like.

This embodiment can be modified as follows.

For example, the viewing-range setting unit 31 may have a digital zoom function that enlarges or shrinks an observation image of the specimen without changing the viewing range of an image displayed on the monitor 40 and may also control the moving speed of the electrically powered stage 11 in accordance with the zoom magnification set by the digital zoom function of the viewing-range setting unit 31.

In this case, the moving-speed calculating unit 51 should calculate the moving speed of the electrically powered stage 11 in accordance with the ratio of the image viewing range relative to the maximum image-acquisition area, the overall magnification of the optical systems, and digital zoom magnification. For example, if the digital zoom magnification is defined as C, moving speed Vn (mm/s) of the electrically powered stage 11 is expressed by the following expression (3).

$$Vn = 1 \times A \times (1/B) \times (1/C) \tag{3}$$

By doing so, for example, even if the electrically powered stage 11 is driven when the observation image of the specimen is enlarged without changing the viewing range of the image with the digital zoom function of the viewing-range setting unit 31 and observation is performed with partial capturing, the moving speed of the observation image relative to the viewing range of the image before enlarging the observation image can be matched with the moving speed of the observation image relative to the viewing range of the image after enlarging the observation image. Furthermore, the moving speed of the observation image relative to the viewing range of the image before partial capturing can be matched with the moving speed of the observation image relative to the viewing range of the image after the partial capturing.

In this modification, the moving speed of the electrically powered stage 11 may be controlled in accordance with the ratio of the image viewing range relative to the maximum image-acquisition area and the digital zoom magnification, without taking the overall magnification of the observation optical system 17 into consideration.

Each of the above-described embodiments can be modified as follows.

For example, the drive instruction unit 33 may serve as a speed instruction unit that gives instructions about the moving speed of the electrically powered stage 11 to the pulse motor 25. In this modification, the drive instruction unit 33 sets a direction in which it is tilted from the upright position as the moving direction of the electrically powered stage 11 and gives instructions about the moving speed of the electrically powered stage 11 in accordance with an angle at which the drive instruction unit 33 is tilted. Specifically, the moving speed of the electrically powered stage 11 is increased with an increasing tilt angle of the drive instruction unit 33 from the upright position. In addition, the moving direction and the moving speed determined by the drive instruction unit 33 are input to the moving-speed calculating unit 51 as drive instructions.

Figure 13:
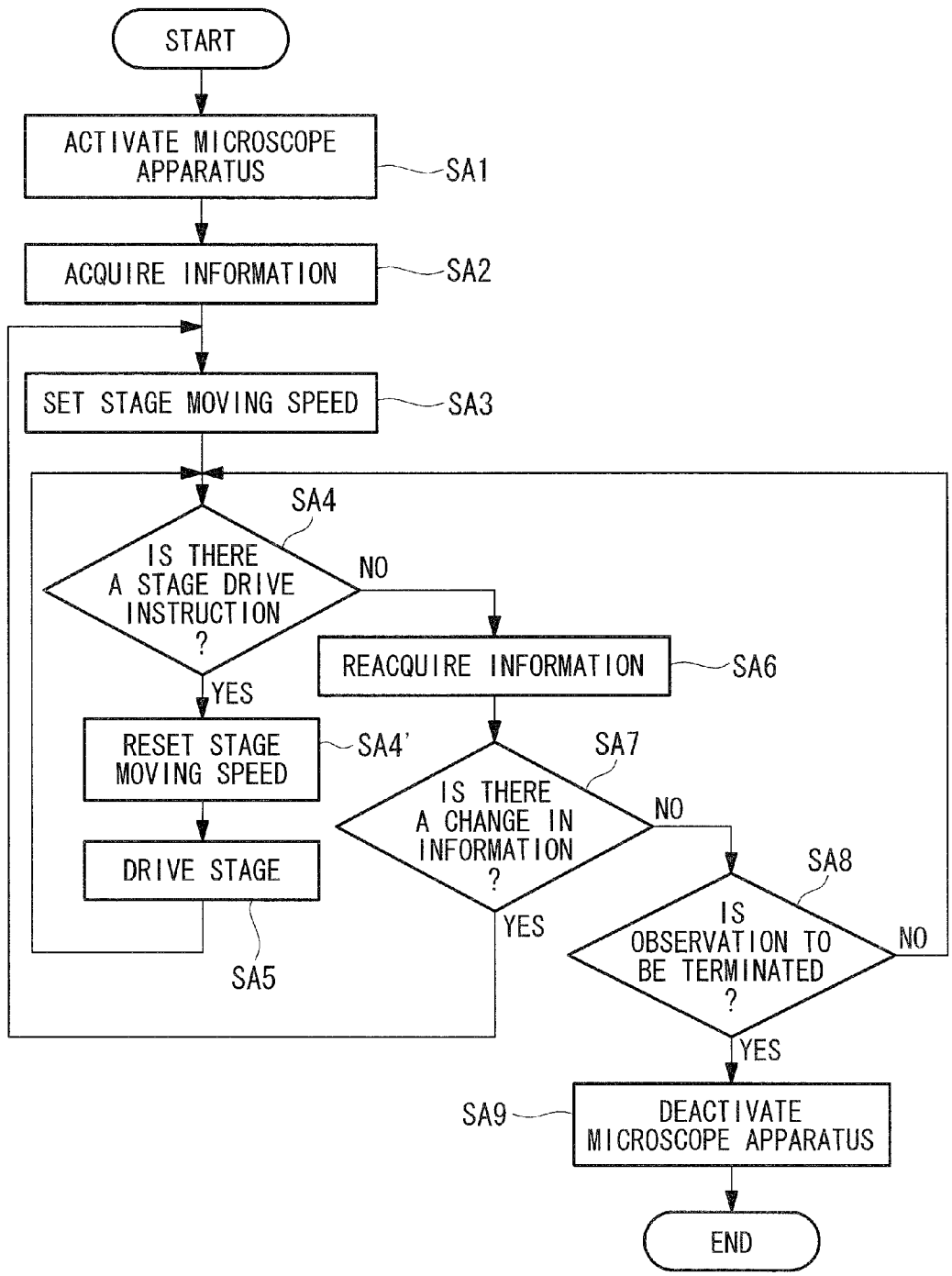
FIG. 13 is a flowchart showing the observation procedure for a microscope system according to a modification of the embodiments of the present invention.

In this case, as shown in the flowchart in FIG. 13, once the drive instruction unit 33 inputs the drive instructions from the user for the electrically powered stage 11 ("YES" in Step SA4), the moving-speed calculating unit 51 resets the moving speed Vn for the electrically powered stage 11 in accordance with the following expression (4) (Step SA4'). For example, tilting angle is assumed to be x and stage drive speed, which serves as a reference, is assumed to be V'.

$$Vn = V' \times \alpha \tag{4}$$

Here, $\alpha$ is a coefficient that is dependent on the tilt angle x of the drive instruction unit 33. For example, $\alpha=0$ (x=0°), $\alpha=1$ (0°<x≤45°), and $\alpha=2$ (45°—x≤90°).

Once the moving speed V5 for the electrically powered stage 11 is set by the moving-speed calculating unit 51, the value is input to the motor controller 27, and the electrically powered stage 11 is moved at the moving speed V5 (Step SA5). Accordingly, the observation image of the specimen moves on the monitor 40 at the moving speed V5.

By doing so, the observation image of the specimen can be moved at a desired moving speed of the electrically powered stage 11, which is given by the drive instruction unit 33. Accordingly, even if the electrically powered stage 11 is moved when the viewing range, etc. of an image on the monitor 40 is changed, the moving speed of the observation image relative to the viewing range of the image can be maintained at the desired moving speed with the motor controller 27.

This embodiment has been described with a joystick as an example of the drive instruction unit; however, so long as the moving direction and moving speed of the electrically powered stage 11 can be set, for example, an XY handle that can control the moving speed of the electrically powered stage 11 in accordance with the number of rotations per unit time may be employed. Also, a device that can separately set the moving direction and the moving speed of the electrically powered stage 11 may be employed.

The embodiments of the present invention have been described above with reference to the drawings; however, specific configurations are not limited to these embodiments, and design alterations within a range that does not depart from the spirit of the present invention are included. For example, the present invention is not limited to those applied to the above-described individual embodiments and the modifications thereof; the present invention may be applied to embodiments in which these embodiments and modifications are appropriately combined, and it is not particularly limited. In addition, in the above-described individual embodiments and the modifications thereof, for example, movements of the electrically powered stage 11 in the X-axis direction and the Y-axis direction are controlled; however, for example, movement in Z-axis direction may also be controlled. When focusing on a specimen, focusing can be readily performed, for example, by changing the moving speed of the electrically powered stage 11 in the Z-axis direction in accordance with changes in various settings.

What is claimed is:

1. A microscope system comprising:
a stage on which a specimen is mounted and that can be moved in a direction that intersects with an optical axis of illumination light irradiated on the specimen;
an observation optical system that acquires an image of the specimen on which the illumination light is radiated;
a display unit that displays a first image acquired by the observation optical system;
a viewing-range setting unit that sets a viewing range of the image in the first image displayed on the display unit, and displays a second image that is a portion of the first image on the display unit;
a ratio calculating unit that calculates a ratio of the viewing range of the image, which is set by the viewing-range setting unit, relative to a maximum image-acquisition area that can be captured by the observation optical system; and
a stage controller that sets a moving speed of the stage with respect to the second image in accordance with the ratio calculated by the ratio calculating unit and a moving speed of the stage with respect to the first image.

2. A microscope system according to claim 1, wherein the ratio calculating unit calculates at least one of a vertical scale factor and a horizontal scale factor of the viewing range of the image, which is set by the viewing-range setting unit, relative to the maximum image-acquisition area.

3. A microscope system according to claim 1, wherein the stage controller increasingly reduces the moving speed of the stage with a reduction in the ratio calculated by the ratio calculating unit.

4. A microscope system according to claim 1, wherein the stage controller controls the moving speed of the stage so as to make the moving speed of an observation image of the specimen relative to the viewing range of the image constant before and after the ratio calculated by the ratio calculating unit is changed.

5. A microscope system according to claim 1, further comprising an overall-magnification calculating unit that calculates an overall magnification of the observation optical system,
wherein the stage controller controls the moving speed of the stage in accordance with the ratio calculated by the ratio calculating unit and the overall magnification calculated by the overall-magnification calculating unit.

6. A microscope system according to claim 5, wherein
the observation optical system is provided with an objective lens that collects observation light from the specimen irradiated with the illumination light; and
the overall magnification includes a magnification of the objective lens.

7. A microscope system according to claim 1, wherein
the observation optical system is provided with an image acquisition unit that captures observation light from the specimen irradiated with the illumination light; and
the ratio calculating unit calculates the ratio on the basis of the maximum image-acquisition area of the image acquisition unit.

8. A microscope system according to claim 1, wherein
the viewing-range setting unit has a digital zoom function that electrically enlarges and shrinks an observation image of the specimen relative to the viewing range of the image; and
the stage controller controls the moving speed of the stage in accordance with the ratio calculated by the ratio calculating unit and a magnification of the observation image of the specimen determined by the digital zoom function of the viewing-range setting unit.

9. A microscope system according to claim 1, further comprising:
a stage drive unit that drives the stage; and
a speed instruction unit that gives an instruction about moving speed of the stage to the stage drive unit.

* * * * *